United States Patent [19]

Treier

[11] 4,069,710

[45] Jan. 24, 1978

[54] APPARATUS FOR THE CAPACITATIVE MEASUREMENT OF THE SURFACE LEVEL OF FLUID MEDIA IN VESSELS

[76] Inventor: Otto Treier, 4317 Wegenstetten, Herrweg, 8756 Mitlodi, Switzerland

[21] Appl. No.: 761,309

[22] Filed: Jan. 21, 1977

[30] Foreign Application Priority Data

Jan. 28, 1976 Germany ............................ 2603185

[51] Int. Cl.² ............................................ G01F 23/26
[52] U.S. Cl. ................................................ 73/304 C
[58] Field of Search ................... 73/304 C, 398 C; 324/61 R; 317/246

[56] References Cited

U.S. PATENT DOCUMENTS

| | | | |
|---|---|---|---|
| 2,300,562 | 11/1942 | Freystedt | 73/304 C |
| 3,540,277 | 11/1970 | Roth et al. | 73/304 C X |
| 3,916,689 | 11/1975 | Donnelly | 73/304 C |

*Primary Examiner*—James J. Gill
*Attorney, Agent, or Firm*—Larson, Taylor and Hinds

[57] ABSTRACT

Apparatus for the capacitative measurement of the surface level of a fluid medium in a vessel comprises a probe mounted to provide a capacitance between itself and the surface, the probe being connected into one of two RC-circuits, respectively connected to opposite ends of a secondary winding of a transmitter, the primary winding of which is in a resonant high-frequency generator circuit. The two RC-circuits are earthed and respectively connected through rectifiers to the inputs of a differential amplifier, the output of which provides an output signal corresponding to the capacitance between the probe and surface level. The RC-circuit associated with the probe comprises a parallel manually adjustable capacitor and a capacitance diode arranged for the remote adjustment of the RC-circuit. Where there is a substantial separation of the probe from the RC-circuits a two-core high-frequency cable is used with one core connecting the probe into the associated RC-circuit and the other core connecting an insulated point on the probe to the other RC-circuit. A simple, sensitive apparatus, unaffected by temperature variations is thereby provided.

10 Claims, 3 Drawing Figures

APPARATUS FOR THE CAPACITATIVE MEASUREMENT OF THE SURFACE LEVEL OF FLUID MEDIA IN VESSELS

FIELD OF THE INVENTION

This invention relates to apparatus for the capacitive measurement of the surface level of a fluid medium in a vessel. A measuring probe is provided on the vessel, the probe capacitance of which, is dependent upon the surface level, and is located in a high-frequency circuit.

DESCRIPTION OF THE PRIOR ART

Many such arrangements are known and also are described in the following documents: German Patent Specification Nos. 1,252,922, 1,252,921, 1,208,515 and 1,179,728, U.S. Pat. No. 3,067,364.

In the known arrangements the probe capacitance serves primarily to vary the frequency of a resonant circuit. The measurement signal is then derived either by comparison in the resonant circuit, influenced by the probe capacitance, with an ideal frequency, or by application of the variable frequency to a band-pass filter and ascertaining the corresponding signal on the working curve of the band-pass filter. Moreover, in this case, the probe capacitance is usually fed into a bridge circuit and the bridge balance is obtained by relatively expensive means as a criterion of the value required.

The known arrangements have a plurality of disadvantages which by reason of their design consist especially in that expensive means for the stabilisation of the resonant circuits must be provided, that expensive balanceable band-pass filters that are difficult to balance are used, that measuring bridges having high accuracy requirements, must be used while moreover the voltage tapped in the zero diagonal of the bridge balance becomes extremely small when approaching the ideal value, so that evaluation causes difficulties. There is also the fact that, when they are being designed, the sensitivity of the known arrangements must be kept relatively low, because otherwise incorrect signals would arise for example due to deviations of the capacitance and/or of the frequency due to temperature variations.

As a whole accordingly the known arrangements are uneconomical to produce, expensive to adjust and furthermore relatively insensitive.

SUMMARY OF THE INVENTION

The invention is based upon the problem of avoiding the disadvantages of the prior art, that is to say especially of producing an arrangement for the capacitive measurement of the surface level of a medium in a vessel, which with substantially improved sensitivity is cheaper to produce and simpler to adjust and set. Moreover, a further object of the invention is to reduce to a minimum deviations caused by temperature changes.

According to the invention, this is primarily achieved by a high-frequency transmitter which is connected on the primary side to a high-frequency generator and whose secondary winding is connected to earth through at least one capacitor on each of the two secondary connections, the capacitance of at least one capacitor being formed at least partially by the probe capacitance, and further characterised by a rectifier arrangement for the rectification of the alternating current voltage present on the capacitors, the direct-current voltage outputs of which are connected to the two inputs of a differential amplifier.

As may be seen, by this arrangement the component expense is small. Moreover, due to the fact that there is a capacitor on each secondary connection of the high-frequency transmitter, every frequency fluctuation of the high-frequency generator is compensated, since the loading of the high-frequency transmitter experiences the same variation on both sides and thus the voltage values applied to the rectifiers in relation to earth remain unchanged. There is also the fact that no expensive bridge circuit of any kind has to be provided, in order to convert the capacitance variation of the probe capacitance into effective voltage variations. Rather, the arrangement represents a kind of capacitive voltage divider where the potential differences across the capacitors are evaluated in the differential amplifier. Thus, as may be seen, it is not a matter of an absolute measurement operation which would be influenced by voltage and frequency fluctuations, but rather of the relative comparison of the voltage difference, dependent exclusively upon the respective capacitance values, over the two capacitors. Resistors may be arranged in parallel with the capacitors in order to render possible the charge transference of the capacitors.

The use of at least one capacitor between each secondary connection and earth also affects the sensitivity of the arrangement. If in fact that voltage on a secondary connection is varied by a specific amount in relation to earth by a variation of capacitance, this has the effect that the other secondary connection is "shifted" in relation to earth by the same amount but with the opposite sign, since the secondary winding is not directly earthed with any connection and thus "floats". In this way, in the conversion of the capacitance fluctuation into a voltage fluctuation, a doubling of the signal is immediately achieved, whereby the sensitivity of the arrangement is substantially improved.

Furthermore, the sensitivity of the arrangement is obviously not confined to a narrow frequency range, as is the case for example when band-pass filters are used, but the variation of the probe capacitance leads independently of the value of the probe capacitance without variation. That is the probe provides a base value to a variation of the ratio of the capacitance values on the two connections of the secondary winding, or to the voltage ratio and thus to a variation of the voltage in relation to earth present on the corresponding secondary connection. By simple adjustment accordingly the arrangement can be used in various fields and even with fluid media which bring about different variations of the probe capacitance.

Very advantageously RC-circuits can be used each comprising a fixed capacitor or an adjustable capacitor and the probe capacitance being connected to the capacitor of the one RC-circuit. Moreover of course various forms of RC-circuits can be used, such as parallel circuits, series circuits or mixed circuits, as long as the influence of the probe capacitance is assured to the extent required in each case by the impedance of the overall arrangement. In specific cases it is also possible to replace the capacitor of the one RC-circuit completely by the probe capacitance.

The oppositely directed voltage shifts occurring on the RC-circuits respectively connected to the two secondary connections can, when the capacitance value of the probe capacitance varies, be adjusted if the measuring and indicating apparatus comprises a control circuit which, in dependence upon the voltage difference at the outputs of the two rectifier arrangements (measured with respect to earth) emits corresponding signals. Quite generally, the method of further processing the output signals in the measuring and indicating apparatus, and this apparatus itself, are well known in the art, and therefore will not be described in greater detail in the present specification. In known manner, the voltage signals emitted at the rectifier arrangements can either be simply amplified and used for indication purposes or can be utilised also as input signals in regulating circuits or for the initiation of other functions.

The voltage difference between the two rectifier arrangements can be ascertained especially advantageously by a differential amplifier, the two inputs of which are connected each to the direct-current voltage outputs of the rectifier arrangement.

Particularly if the high-frequency generator and high-frequency circuit are provided in a unit located in the vicinity of the measuring probe, the invention can be further improved if the high-frequency transmitter is connected on the primary side into a resonant circuit and if the capacitance of the RC-circuits is provided at least partially as an oscillator capacitance. Thus the cost of the circuit construction is reduced, components are saved, and furthermore a substantial simplification of the circuit arrangement is achieved.

Especially if the probe capacitance is connected through a lengthy cable to the high-frequency circuit, which can be necessary for example where high temperatures arise or strong vibrations occur at the position at which the probe is secured and where the material in the vessel has a low dielectric constant, a further improvement may be provided in that the connection cable between the probe and other parts of the circuit is a two-core high-frequency cable of which one core serves to connect the probe capacitance and RC-circuit and the other core terminates at one end at an insulated point on the probe and at the other end is connected to the other RC-circuit. Obviously thus all influence of the cable capacitance, for example as a result of temperature fluctuations, is excluded by the fact that the said capacitance fluctuations influence the two RC-circuits in the same way, whereby compensation is achieved, without expensive components or special adjustment work being necessary.

If an adaptation or pre-setting of the apparatus to different capacitance values of the capacitance probe are to be effected in operation, a capacitance diode may be provided at least in one RC-circuit. Thus in the simplest way and irrespective of the position at which the probe capacitance is located or of the high-frequency circuit, by simple variation of the voltage present on the capacitance diode it is possible to alter the impedance of the RC-circuit, whereby both fine adjustment and adaptation to different filling media in the vessel and to different surface levels in the vessel can be provided in a simple way.

As may be seen the technical progress and inventive content of the subject of the application arise both in the new individual features and especially in the combination and sub-combinations of these features.

DESCRIPTION OF THE DRAWINGS

Examples of the invention will now be described in greater detail with reference to the accompanying drawings, wherein.

Figure 1:
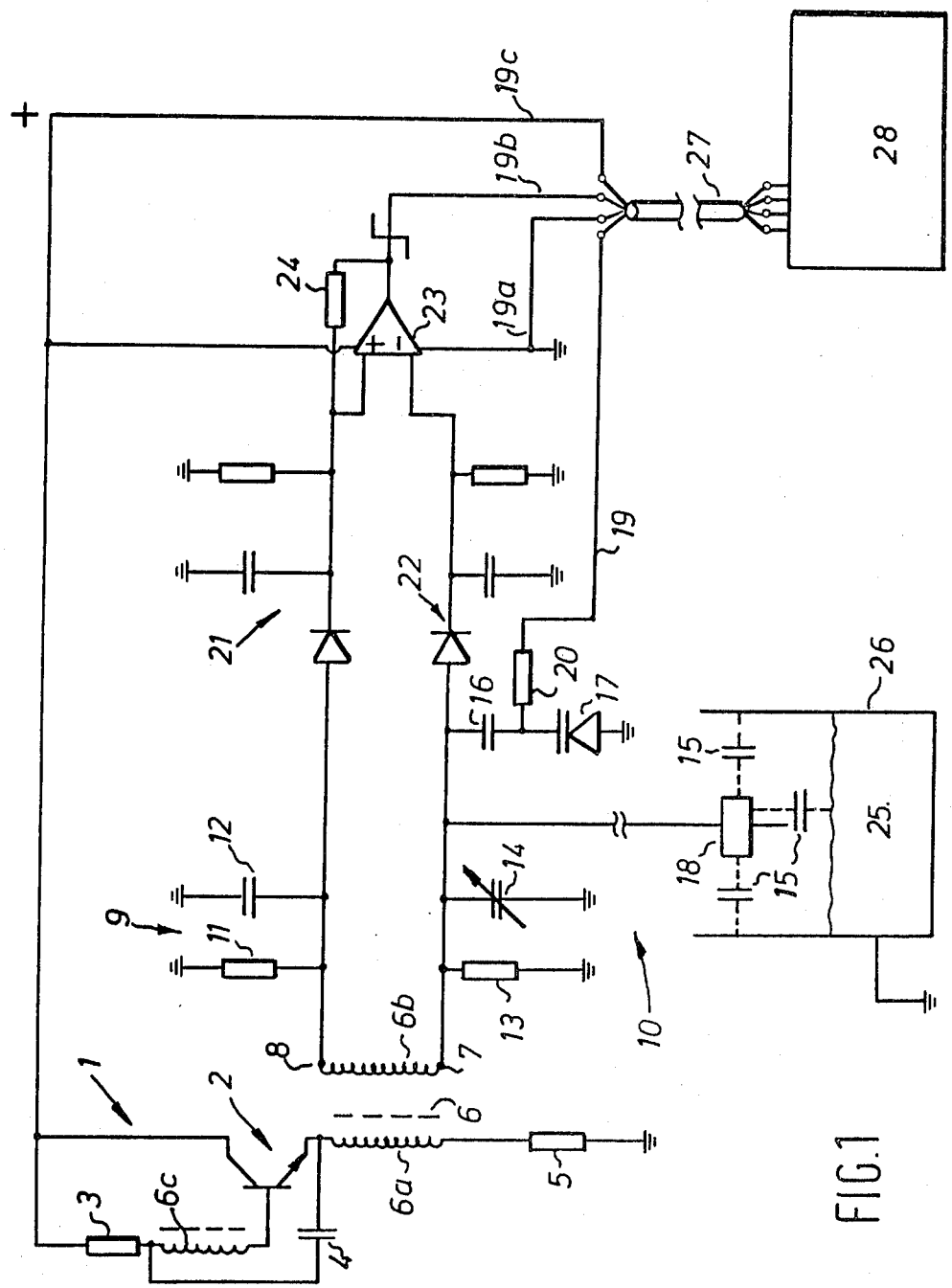
FIG. 1 is a circuit diagram of measuring apparatus responsive to the level of a medium in a vessel.

The apparatus shown in the drawings, comprises a high-frequency generator 1, which consists of a transistor 2 in combination with a base resistor 3, capacitor 4, emitter resistor 5 and a high-frequency transmitter 6. The transmitter 6 is incorporated both in the emitter circuit and in the base circuit in known manner. The high-frequency transmitter is a transformer having a primary side 6a and a secondary side 6b which is earthed by way of terminals 7 and 8 respectively connected to RC-circuits 9 and 10. The primary side 6a, the secondary side 6b are inductively coupled and are coupled to an additional winding 6c in known manner so that the entire arrangement oscillates and so that the capacitance of the RC-circuits 9 and 10 acts as a resonant capacitance. Of course the resonant circuit provided by the RC-circuits 9 and 10 can be replaced by other known arrangements but the example shown is distinguished by simple assembly and economy of components.

While the RC-circuit 9, as shown in FIG. 1, consists only of a resistor 11 and a capacitor 12, the second RC-circuit 10 comprises a resistor 13, a manualy adjustable capacitor 14, an effective probe capacitance 15 and an additional circuit consisting of a capacitor 16 and a capacitance diode 17. The capacitance 15 arises as a result of the location of a probe 18 with respect to the level of a fluid medium 25. The resistors 11 and 13 are of high ohmic value and serve primarily to transfer the charges of the capacitors of the two RC-circuits 9 and 10. The components are dimensioned so that by appropriate balancing of the capacitor 14 and of the capacitance diode 17 the impedance of the RC-circuit 10 can be brought to the value possessed by the RC-circuit 9. The capacitor 14 is provided in order to render possible pre-balancing of the arrangement to suit different probes 18. On the other hand the capacitance diode 17 serves to render possible the adjustment of the impedance of the RC-circuit 10 in a simple manner from an operating and supply installation 28 located at a relatively great distance from a vessel 26 in which the level of the medium 25 is to be measured. This is effected in known manner by variation of the voltage applied to the capacitance diode 17 through a resistor 20 and lead 19 connected through a cable 27 to the installation 28.

The voltage present on the RC-circuit 9 or on the RC-circuit 10 is applied through rectifier arrangements 21 and 22 to a differential amplifier 23 having a feedback connection through a resistor 24. The differential amplifier possesses a bistable control circuit of which one switch condition is present below a predetermined voltage differential value of the outputs of the rectifier arrangements and the other switch condition is present on reaching and exceeding that value.

The measurement of the filling level of the medium 25 in the vessel 26 is carried out by the arrangement of FIG. 1 as follows:

As already stated above, the RC-circuit 10 is balanced or pre-balanced by means of the capacitor 14 and the capacitance diode 17 in such a way that when the vessel 26 is filled to a level lying below an ideal value, the total capacitance of the RC-circuit 10 corresponds to the capacitance of the RC-circuit 9. As soon as a variation of the probe capcitance 15 occurs due to rise of the medium 25 in the vessel 26, the capacitance value and thus the impedance of the RC-circuit 10 varies. This has the effect that the voltage value present on the terminal 7 varies in relation to earth. Since the internal resistance of the secondary winding 6b of the transmitter 6 is extraordinarily low in comparison with the overall circuit, the voltage measured between the terminals 7 and 8 remains the same. This signifies that every variation of the voltage on the terminal 7 in relation to earth effects a variation of the voltage on the terminal 8 in relation to earth by the same amount but with opposite sign. The voltage difference between the two terminals 7 and 8 accordingly has, by reason of the peculiarity of the circuit, twice the value of the voltage variation on the terminal 7 alone, and is effected directly by the probe capacitance 15.

As already indicated, the high-frequency voltage which is present on the RC-circuits 9 and 10 and the connections 7 and 8 is delivered to two rectifier arrangements 21 and 22, the direct-current voltage outputs of which are connected to the two inputs of the differential amplifier 23.

With increasing variation of the surface level of the medium 25 in the vessel 26, obviously there is variation of the value of the probe capacitance 15 and thus of the differential voltage value applied to the differential amplifier 23 by the rectifier arrangements 21 and 22.

As soon as the voltage value has reached a specific maximum value, on reaching an intended filling level, the differential amplifier 23 transmits an output signal to the operating and feed installation 28 which, in a manner not shown, produces an optical and/or acoustic warning signal. The differential amplifier 23 by appropriate dimensioning of the feedback resistor 24, is used in known manner in this example merely as a switch which above a specific threshold value delivers a signal while below this threshold value there is a zero signal at the output. Of course in place of the differential amplifier any desired other known circuit arrangement can be used which provides a threshold value measurement, or proportional signals can be derived which not only indicate two conditions but render possible a genuine measurement of the filling level in dependence upon the variation of the probe capacitance 15 or of the voltage values delivered by the rectifier arrangements 21 and 22.

The operating and supply apparatus 28 is connected through leads 19, 19a, 19b and 19c in the cable 27 with the entire apparatus comprising the high-frequency generator 1, RC-circuits 9 and 10, rectifier arrangements 21 and 22 and the differential amplifier 23.

This renders possible the placing of the said apparatus directly on the vessel, so that the distance between the probe 18 and RC-circuit 10 can be kept short, whereby interfering influences are avoided. On the other hand the length of the cable 27 is of relatively subordinate importance, since obviously only direct-current voltage is present on the leads 19 to 19c, while the cable connected to the probe 18 is connected to a high frequency source and directly participates in influencing the impedance of the RC-circuit 10.

Figure 2:
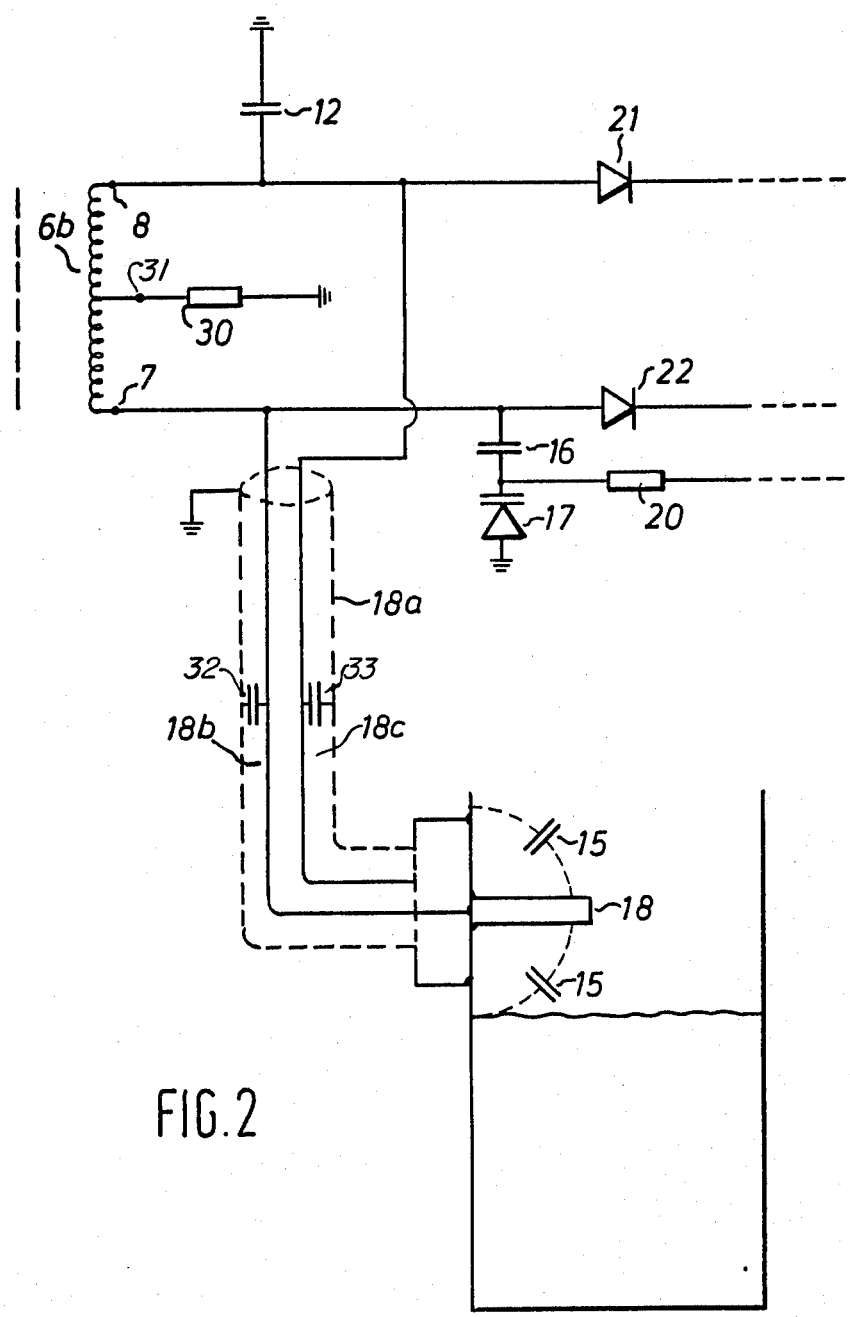
FIG. 2 shows a modification of the circuit of FIG. 1.

In some specific uses of the invention, as for example when the probe 18 and its cable are subjectd to high temperature fluctuations or when the provision of an especially long probe cable is necessary in order to avoid the effect of interfering influences on the cable, a two-core screened connection cable 18a as shown in FIG. 2 may be provided. In the cable 18a, one core 18b serves for use with the measuring probe 18 while the other core 18c, which is made of the same length as the core 18b, terminates at one end blind and insulated and is connected at the other end to the RC-circuit 9. Every influence on the cable 18a resulting, for example, from temperature drift is accordingly transmitted in the same manner to both RC-circuits 9 and 10, as indicated diagrammatically by the representation of cable capacitance 32 and 33.

In contrast to the example according to FIG. 1, moreover, in the arrangement according to FIG. 2 the probe capacitance 15 is provided as the sole capacitance value in the RC-circuit 10 and the capacitor 12 is correspondingly dimensioned.

Moreover the two RC-circuits 9 and 10 of FIG. 2 have only one common resistor 30 which connects a centre tapping 31 of the secondary winding 6b with earth.

Obviously modifications in the circuit and use of different components are readily possible to the person acquainted with the art, without thereby departing from the scope of the invention.

Figure 3:
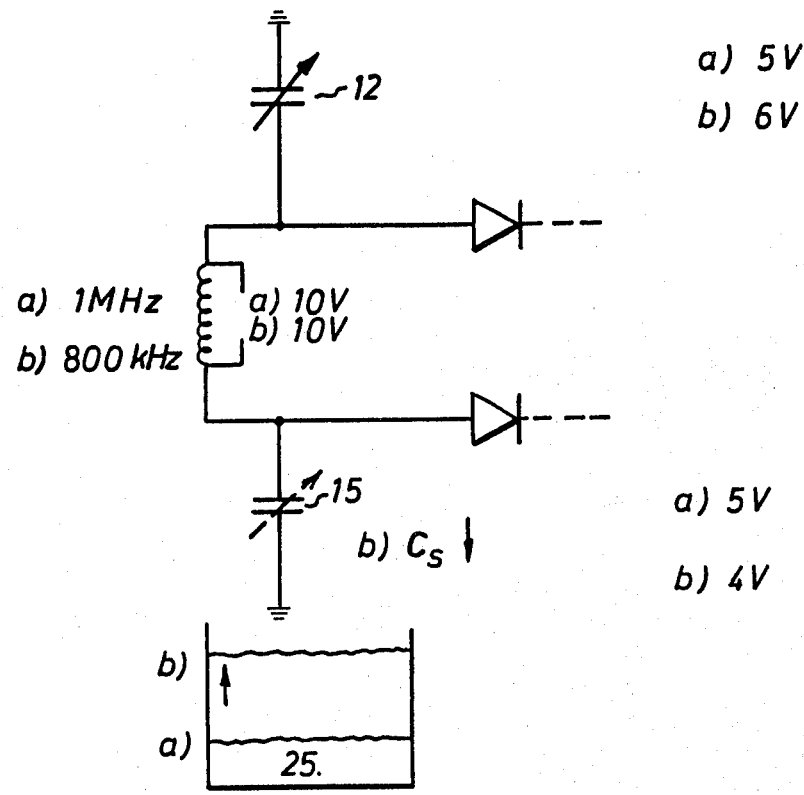
FIG. 3 is an explanatory diagram.

FIG. 3 shows diagrammatically the voltage change on the probe capacitance 15 and the comparison capacitor 12 in the case of a capacitance variation. In the condition marked by (a), the arrangement is balanced so that the same voltage value of 5V is the potential difference over both the capacitor 12 and the capacitance 15. A diagrammatically indicated rise of the level of the medium 25 from the position (a) to position (b) effects a rise of the capacitance value of the probe capacitance 15. Thus the resistance value changes and the potential difference over the probe capacitance 15 sinks to the amount of 4V, assumed for the condition (b). Since however 10V are emitted constantly through the secondary winding 6b of the transmitter 6, the voltage on the capacitor 12 increases to 6V, which leads to an overall voltage difference of 2V. The reduction of the oscillator frequency (stated as 800 KHz) effected by the variation of the probe capacitance obviously has no influence upon the voltage division, since in this case the alternating current voltage resistance of the two capacitances 12 and 15 varies proportionally and thus the distribution of the voltage values remains contant.

I claim:

1. Apparatus for the measurement of the surface level of a fluid medium in a vessel, comprising a vessel, a high-frequency electrical generator, a high-frequency transmitter having inductively coupled primary and secondary portions, means connecting said generator and said transmitter for the supply of high frequency electric current to said primary portion, first and second terminal connectors with said secondary portion connected therebetween to provide a high-frequency induced current between said terminal connectors, a first capacitor, means earthing said first terminal connector by way of said first capacitor, a probe mounted on said vessel to provide a second capacitor providing a capacitance between said probe and fluid medium in said vessel, said capacitance depending on the surface level of fluid medium in said vessel, means earthing said second terminal connector by way of said second capacitor, rectifier means, and means connecting said rectifier means to said first and second capacitors for the rectification of alternating voltages present on said capacitors, thereby providing direct-current voltage outputs respectively from said first and second capacitors, and means having two inputs respectively connected to receive said voltage outputs and itself providing an output corresponding to said capacitance and, therefore, to said surface level.

2. Apparatus according to claim 1, in which said means having two inputs is a differential amplifier.

3. Apparatus according to claim 2, in which said differential amplifier comprises a bistable control circuit of which one condition is present below a predetermined voltage differential value of said direct-current voltage outputs of said rectifier means and the other condition is present at and above said value.

4. Apparatus according to claim 1, comprising a further capacitor and means earthing said second terminal connector by way of said further capacitor and in parallel with said second capacitor.

5. Apparatus according to claim 14, in which said further capacitor is a manually adjustable capacitor.

6. Apparatus according to claim 4, in which said further capacitor is a capacitance diode.

7. Apparatus according to claim 4, comprising a first re-charging resistor connected between said first terminal connector and earth, in parallel with said first capacitor, and a second re-charging capacitor connected between said second terminal connector and earth, in parallel with said further capacitor.

8. Apparatus according to claim 1, in which said generator and transmitter are connected together in a resonant circuit and in which said capacitors connected to said first and second terminal connectors provide, at least partially, an oscillator capacitance for said resonant circuit.

9. Apparatus according to claim 1, comprising a two-core high-frequency cable, one said core providing said means earthing said second terminal connector, and the other said core being connected between said first terminal connector and an insulated location on said probe.

10. Apparatus according to claim 1, comprising a recharging resistor, said secondary portion of said transmitter having a centre tapping connected to said re-charging resistor.

* * * * *